INVENTOR.
JAMES E. HANCOCK
BY
Fishburn and Gold
ATTORNEYS

Dec. 7, 1965    J. E. HANCOCK    3,221,424
RAKE-TYPE LOADER FOR SCRAPER
Filed May 15, 1963    3 Sheets-Sheet 2
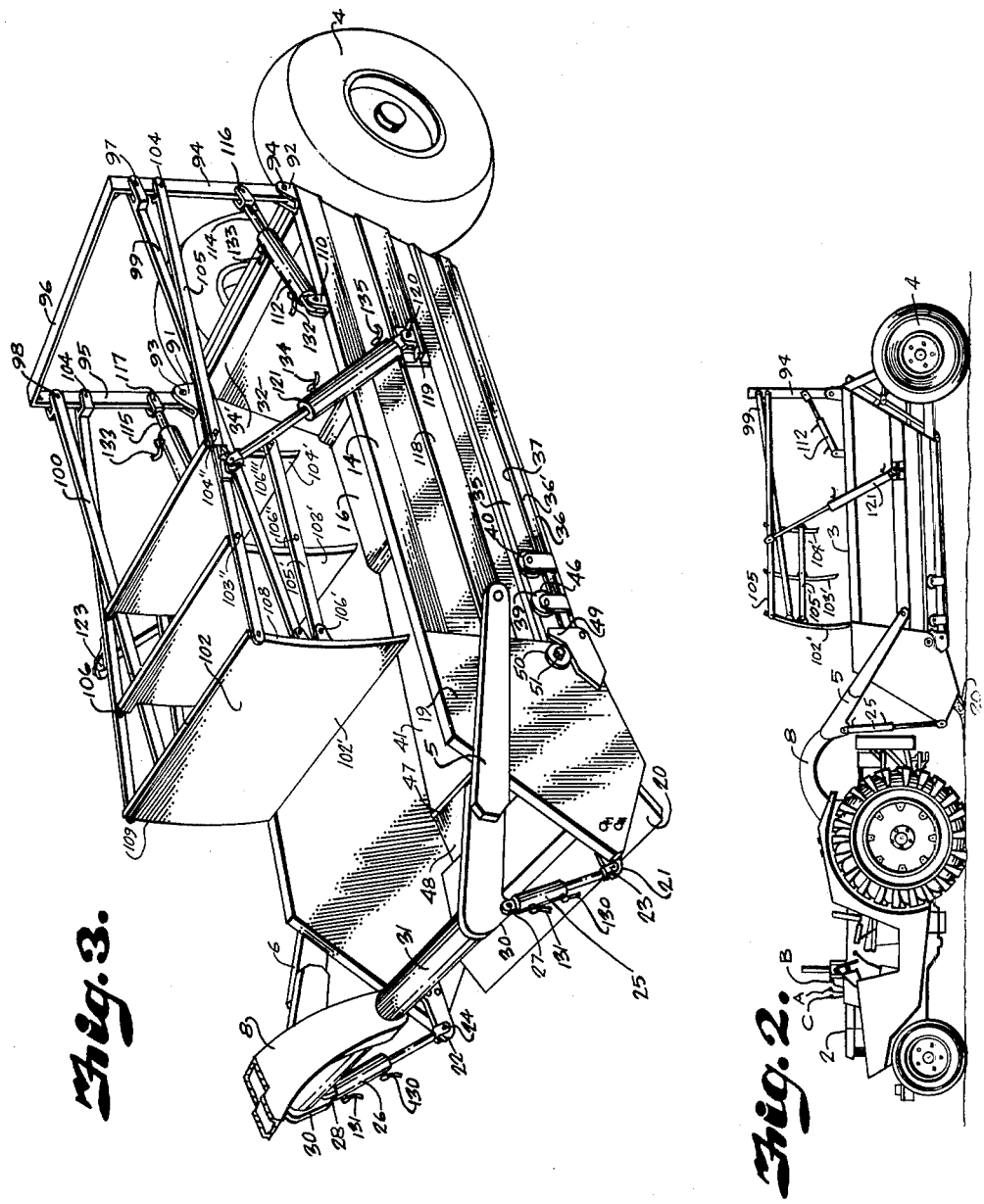
INVENTOR.
JAMES E. HANCOCK
BY
Fishburn and Gold
ATTORNEYS Dec. 7, 1965   J. E. HANCOCK   3,221,424
RAKE-TYPE LOADER FOR SCRAPER
Filed May 15, 1963   3 Sheets-Sheet 3
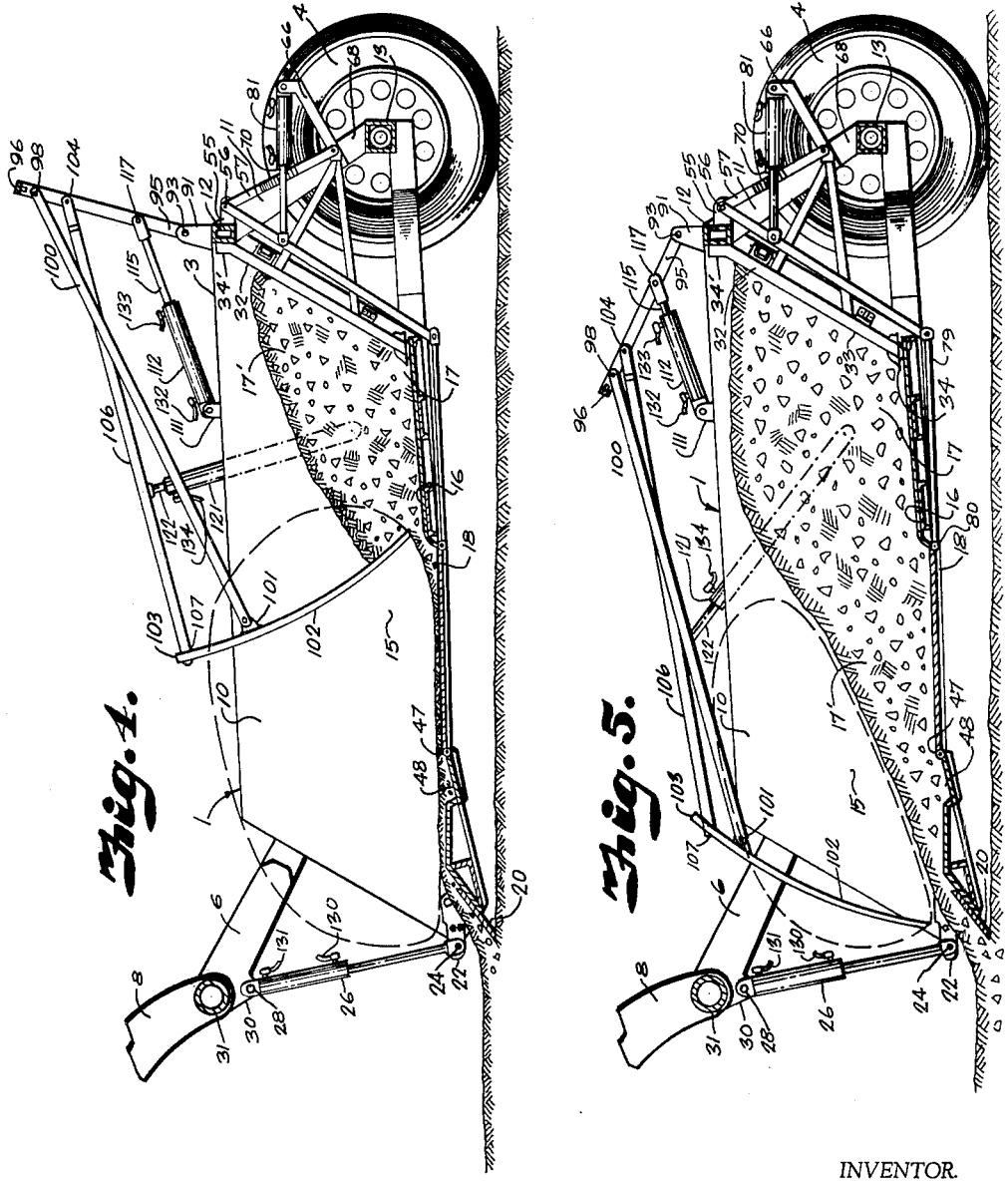
INVENTOR.
JAMES E. HANCOCK
BY
Fishburn and Gold
ATTORNEYS

United States Patent Office 3,221,424
Patented Dec. 7, 1965

3,221,424
RAKE-TYPE LOADER FOR SCRAPER
James E. Hancock, Lubbock, Tex., assignor to Hancock Manufacturing Company, Lubbock, Tex., a corporation of Texas
Filed May 15, 1963, Ser. No. 280,569
12 Claims. (Cl. 37—129)

This invention relates to earth handling apparatus and particularly apparatus of the type disclosed in Patent No. 3,066,429, issued December 4, 1962.

The principal feature of the present invention resides in the rake and apron attachment for movement of the dirt released by the scraper blade of the device into the box or load carrying portion of the scraper.

In elevating scrapers of this character various conveyors of the type shown in Patent No. 3,066,429 have been used for movement of the dirt into the box. It is believed the present rake arrangement is an improvement over such conveyors of the types heretofore used and particularly when handling dirt with rocks the chain conveyor type having slats for movement of the dirt rocks would sometimes cause damage thereto and some rocks would be too large to be handled by the conveyor. With the present type of rake conveyor the rocks will be contacted by the apron and moved into the box of the scraper without damage thereto.

The principal objects of the present invention are to provide means for movement of the dirt into the box of the scraper by a rake or apron type apparatus wherein the rake is operated by hydraulic means and arms having scissor-like action in movement of the apron upwardly, downwardly, forwardly and rearwardly; to provide a rear standard for the rake attachment hydraulically operated and having arms connected thereto extending forwardly in criss-cross relation and attached to the apron of the apparatus whereby the apron may be raised and extended forwardly ahead of the scraper and follow a variable path along the ground and just above the blade and then backwardly and upwardly toward the rear of the scraper box; to provide control means for varying the path of the apron either while the box is being loaded or returning the apron forwardly in a more or less horizontal forward and backward travel; to provide the control means in easy reach of the operator of the scraper; to provide one pair of hydraulic cylinders to control the backward and forward movement and another pair of cylinders to control the upward and downward movement of the apron at the will of the operator, and to provide means for pivotally mounting of the rake attachment to the side frames of the box.

Other objects of the invention are to provide easy control of the rake attaching apparatus and smoothness of operation or movement of the dirt from the scraper blade into the box and the ease of control of the rake during loading and unloading operation as well as the apron part of the rake acting as a front end for the box to retain the dirt therein during transportation.

Other objects and advantages of this invention will become apparent from the following description taken in connection with the accompanying drawings wherein are set forth by way of illustration and example certain embodiments of this invention.

FIG. 2 is a side view of the scraper shown attached to the tractor.

FIG. 3 is a perspective view of the scraper and rake attachment thereon.

FIG. 4 is a side view similar to FIG. 1 with the movement of the apron of the rake in a dirt moving rearward position.

FIG. 5 is a view similar to FIG. 4 with the rake apron moved to a forwardly position and showing its path when the box is partly filled.

Figure 1:
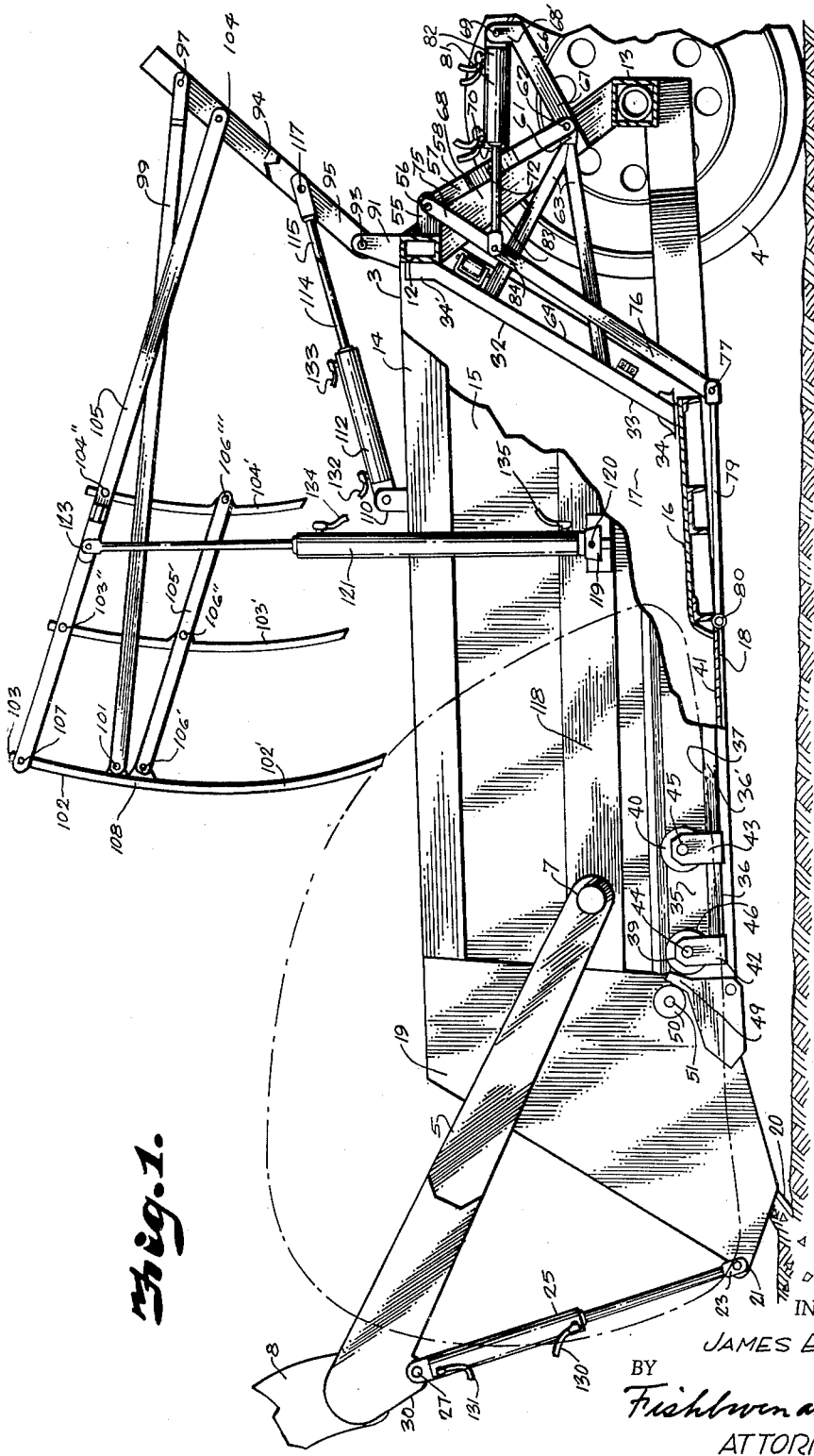
FIG. 1 is a side elevational partly cross-sectional view of the invention shown attached to a scraper with parts broken away to better illustrate the same.

Referring more in detail to the drawings:

The numeral 1 designates a trailer type implement propelled by a tractor 2. The trailer type implement is an elevated scraper or earth moving apparatus having a frame 3, the rear end of which is supported by ground engaging wheels 4 and the forward end of the frame has a pair of arms 5 and 6 pivotally connected thereto as indicated at 7 (FIG. 1), with said arms extending forwardly and terminating in a gooseneck 8 having a fifth wheel connection or the like to the tractor 2 as shown in Patent No. 2,994,976.

The frame 3 includes side members 10 with upright members 11 near the rear end connected by an upper cross member 12 and a lower cross member 13 also as illustrated in Patent No. 2,988,832. The frame 3 includes side rails 14 at the upper extremity thereof and which extend forwardly of the rear end of the frame 3 and secured to the side rails 14 are side walls 15 closed by a bottom 16 forming a box 17 for the earth material 17'. The bottom 16 extends forwardly from the rear frame a substantial distance but terminates rearwardly of the forward extent of the side walls 15 forming a door opening 18. The side walls have forwardly extending portions 19 on each side thereof.

The forwardly extending portions 19 extend forwardly of the side walls 15 and secured to each of the forward portions 19 of the frame is a scraper blade 20 extending between the sides and transversely of the trailer unit. The extensions 19 of the side walls are provided with brackets 21 and 22 at each side of the framework structure to which is pivotally attached as indicated at 23 and 24 one end of hydraulic extensible members 25 and 26 and having their other ends pivotally attached as indicated at 27 and 28 to brackets 30 extending forwardly of the arms 5 and 6. The gooseneck 8 is attached to a cross member 31 which has its respective ends secured to the brackets 30 whereby the extension of the extensible members moves the side walls with the blade 20 and thus the forward end of the trailer type implement downwardly relative to the arms 5 and 6 to engage the scraper blade 20 with the ground.

An endgate or ejector plate 32 is provided for movement within the box 17 and comprises the rear of the box when the endgate is in the rearmost position as illustrated in FIG. 1. The lower edge 33 of the endgate 32 provides an edge 34 for movement along the floor or fixed bottom 16 of the rear portion of the box. The upper edge portion 34' of the endgate 32 is angled substantially vertically to prevent the dirt from spilling over the structure. The upper edge 34' of the endgate 32 in its rearmost position rests against the cross member 12 and forms a rear closure member for the box 17.

Secured to a horizontal portion 35 of the side members 15 are angle shaped members 36. The horizontal portion 36' of the angle shaped members 36 form a trackway 37 on each side of the frame 3 for supporting pairs of rollers 39 and 40 mounting a door 41 movable under the bottom of the box 17 for closing the door opening 18. Spaced from the forward and rear ends of the bottom 16 closing the door 41 on each side thereof and suitably secured thereto by welding or other means are upstanding brackets 42 and 43 provided with openings for receiving short shafts 44 and 45 for mounting the rollers 39 and 40 respectively which are flanged on one side as indicated at 46 so that the inner surface of the flange 46 engages laterally against the angle shaped member 36. Brackets 42 and 43 support the moving bottom which is slidable underneath the fixed bottom 16 as illustrated in FIG. 1.

Hinged to the forward edge 47 of the movable bottom 41 is a strike-off blade 48 for leveling of the earth material 17' as it drops from the door opening in the bottom of the box 17 as hereinafter shown. The strike-off blade 48 has horns 49 extending upwardly from the rear thereof and acts as cams for engaging a roller 50 mounted on a shaft 51 secured to the side members 19 of the box 17 also as illustrated in FIG. 1 so that when the door 41 is moved forwardly the horns 49 will strike the rollers 50 and the strike-off blade 48 will be moved to a horizontal position as shown in FIG. 1.

The endgate 32 may roll on the bottom 16 of the box 17 as illustrated in my Patent No. 3,066,429.

Rigidly secured to the cross member 12 are outwardly extending arms 55 having openings in their outer ends for receiving the ends of a shaft 56. Spaced arms 57 having one end pivotally attached to the shaft 56 extend rearwardly and downwardly with their other ends connected with an extension connection 61 by a pin or the like 62. The extension connection has a plurality of legs 63 which diverge from the connection with said arms and have their other ends spaced and rigidly secured by welding or other suitable means to the rearward side 64 of the endgate 32 as illustrated in FIGS. 4 and 5 so as to distribute the forces for moving the endgate 32 in the box 17. A substantially U-shaped bracket member 66 has free ends of its side arms 67 rigidly secured to the diagonal brace 68 of the frame structure 3 as illustrated in FIG. 1. The U-shaped member has upstanding ears 68' mounting a shaft 69 to which is pivotally mounted one end of a cylinder 70. The piston rod of the cylinder 70 is pivotally attached as indicated at 72 to the arm for movement of the endgate forwardly and rearwardly in the box as illustrated in my Patent No. 3,066,429.

Pivotally attached at one end 75 to the shaft 56 is a bar 76 having its other end pivotally connected at 77 to a rod or bar 79 having its other end pivotally connected as at 80 to the rear center portion of the movable door 41 for moving the door forwardly and rearwardly by means of a hydraulic ram 81 of double acting type. One end of the cylinder 82 of the ram is pivotally attached to the bracket 66. A piston rod 83 extends from the other end of the cylinder 82, said rod having its free end pivotally attached by a pin 84 to the bar 76.

A fluid supply is connected to the cylinder heretofore described by lines as illustrated in Patent No. 3,066,429, and may be operated by the fluid supply from the tractor or from a separate supply as desired.

Mounted on the rear ends of the top side rails 14 and the cross member 12 are upstanding brackets 92 and 91 to which are pivotally mounted by pins 94' and 93 generally upwardly extending arms 94 and 95 secured together at the top by cross arm 96. Pivotally mounted near the top of the arms 94 and 95 are arms 99 and 100 having their forward ends pivotally attached as indicated at 101 to the apron or rake element 102 adjacent side edges thereof and spaced from the top edge 103 of an apron or rake element 102.

Also pivotally mounted to the upstanding arms 94 and 95 but spaced below the pivoted ends of the arms 99 and 100 as indicated at 104 are forwardly extending arms 105 and 106 having their forward ends pivotally attached as indicated at 107 to the side edges 108 and 109 of the apron 102 near the upper edge 103 as illustrated in FIG. 3. It will be noted the arms 99 and 100 and 105 and 106 are criss-crossed or scissor type.

Secured to the upper edge of the side rails 14 and spaced from the rear end of the box 17 are upstanding brackets 110 and 111 for receiving and pivotally mounting thereto one end of cylinders 112 having piston rods 114 and 115 extending rearwardly and pivotally attached as indicated at 116 and 117 to the arms 94 and 95 and spaced from the bottom thereof as illustrated in FIG. 3.

Rigidly mounted on the outside of the sides 15 are elongated members 118 to which are rigidly secured channel members 119. Pivotally attached by pins or the like 120, are one end of cylinders 121 having a piston rod 122 pivotally attached as indicated at 123 to the arms 105 and 106 spaced rearwardly of the apron 102 but forwardly of the scissor of said arms.

In the illustrated structure the apron or rake element 102 extends transversely of the box 17 and may have one or more rakes or aprons. In the structure illustrated in FIGS. 1 to 3 inclusive there is a plurality of rakes or aprons operatively connected together to operate in a similar manner as tandem drags to move dirt to the rear of the box. This permits the dirt to be moved by the aprons in relays and with shorter strokes. The main apron or rake blade 102' is pivotally connected to the arms 99 and 100 and 105 and 106 and blades 103' and 104' are arranged in rearwardly spaced relation to the blade 102'. The upper side portions of the blades 103' and 104' are pivotally connected to the arms 105 and 106 as at 103" and 104" respectively with said blades extending generally downwardly therefrom between the arms 99. A link 105' is arranged on each side of the blades and spaced downwardly thereof from the arms 99 and 100 said link 105' being pivotally connected to each of the blades 102', 103' and 104' by pivot members 106', 106" and 106'''. It is to be understood that one blade or combinations of the blades may be used. The multiple blades adding to the length of the stroke that may be obtained or the same raking length may be obtained with less extension of the cylinder 112 and piston rods 114 and 115. The path of travel of the lower edge of the blade 102' as shown by the broken lines in FIG. 1 is also representative of the paths of travel of the lower edges of the blades 103' and 104' except for the longitudinal spacing corresponding to the spacing of the blades. In the structure shown in FIGS. 4 and 5 the blades 103' and 104' are removed and the single blade 102' is used.

In operation of the scraper as above illustrated and described the control lever A may be manipulated to supply a fluid from a source of fluid pressure from the tractor or other source to the cylinders 25 and 26 through lines 131 to lower the cutting blade 20 to the ground to contact the earth to loosen the dirt where it can be contacted and moved into the box by the raking apparatus above described. To raise the cutting blade fluid is supplied to the cylinders 25 and 26 through lines 130. The operation of the control and fluid for raising and lowering the scraper blade is the same as that shown in Patent No. 3,066,429.

The cylinders 112 have fluid inlet and outlet connections as indicated at 132 and 133 respectively and the cylinders 121 also have fluid inlet and outlet connections 134 and 135 respectively. By movement of the lever B in a rearward direction the piston rods 114 and 115 will be extended from the cylinders 112 to move the upright members 94 and 95 in a rearward position as shown in FIG. 1. By movement of the lever B to one side the piston rods 122 in the cylinders 121 will be extended as shown in FIG. 1 to raise the aprons 102', 103' and 104' also shown in FIG. 1. Movement of the lever B in a forward direction will cause retraction of the piston rods 114 and 115 in cylinders 112 to move the apron in a forward direction. By movement of the lever B to one side or to the opposite side of the movement for extension of the piston rod 122 the rods will be retracted to lower the apron as shown in FIG. 5. By movement of the lever B rearwardly the piston rods 114 will be extended to move the raking frame in a rearward direction to move the dirt into the box as shown in FIG. 4. By repeating the same process of operation of the lever B the raking apparatus will be repeated to consecutively move the dirt into the box or carrier 17.

It will be obvious that by manipulation of the lever

B shorter distances of the rake may be controlled so that when the box is partially filled the position of the blade movement of the blade in a rearward direction will not be so far but may take the position shown in dotted lines in FIG. 5. When the box is full the apron may be lowered at the front as illustrated in FIG. 5, to act as a front end to the box to retain the dirt therein during transportation.

When the dirt is to be emptied from the box or carrier the control lever C may be operated for controlling the fluid to the cylinder 81 and for movement of the endgate 32 and door 41 to open the door opening 18 for movement of the dirt forwardly in the box to spill therethrough as illustrated in Patent No. 3,066,429. The door and endgate operate in sequence to the pressure required for movement of the same through the cylinders 70 and 81.

When the door 41 is moved rearwardly the strike-off blade 48 will be released and assume a vertical position to act as a leveler for the dirt as it passes through the door opening 18.

While I have illustrated the dirt raking apparatus in connection with a scraper of the drawn tractor type, it will be obvious the invention may be used with other scraper or carrier structure including self-propelled scrapers and the like.

It will be obvious from the foregoing that I have provided an improved raking apparatus for movement of dirt or earth into an elevating scraper mechanism quickly and easily controlled and operated with few wearing parts.

It will be understood that while I have illustrated and described one form of my invention it is not to be limited to the specific form or arrangement of parts herein described and shown except insofar as such limitations are included in the claims.

What I claim and desire to secure by Letters Patent is:

1. Apparatus for handling dirt comprising:
  (a) a mobile frame,
  (b) a dirt collecting box having side walls and a bottom, and a door opening in said bottom,
  (c) scraper means for loosening said dirt for movement into the dirt collecting box as the apparatus is moved forwardly,
  (d) means mounted on the dirt collecting box for movement of the dirt into said box as it is loosened by the scraper means, said means including a frame pivotally mounted on the rear portion of said box and having pairs of forwardly extending arms on each side of said box and having one of their ends pivotally attached to said frame in spaced relation, a raking element on the forward ends of said pairs of arms and extensible and retractable means connected to said box and to said frame and to said side walls of the box and to a pair of said arms for movement of the raking element in an upwardly and forwardly direction and in a downwardly and rearwardly direction.

2. The apparatus of claim 1 including means for unloading said dirt from said box.

3. Apparatus for handling dirt comprising:
  (a) a mobile frame,
  (b) a dirt collecting box having side walls and a bottom,
  (c) scraper means at the forward end of said box for loosening said dirt for movement into the dirt collecting box as the apparatus is moved forwardly,
  (d) means mounted on the dirt collecting box for movement of the dirt into said box as it is loosened by the scraper means, said means including a frame pivotally mounted on the rear portion of said box and having pairs of forwardly extending arms on each side of said box and having one of their ends pivotally attached to said frame in spaced relation, a raking element on the forward ends of said pair of arms, means connected to said box and to said frame and to said side walls of the box and to a pair of said arms for movement of the raking element in an upwardly and forwardly direction and in a downwardly and rearwardly direction,
  (e) an opening in said bottom of the box,
  (f) means for closing said opening when loading said box, and
  (g) means for movement of the dirt through said opening for unloading said dirt.

4. Apparatus for handling dirt comprising:
  (a) a mobile frame,
  (b) a dirt collecting box having side walls and a bottom,
  (c) scraper means for loosening said dirt as the apparatus is moved forwardly,
  (d) upwardly extending arms pivotally secured to the top of said side walls near the rear thereof,
  (e) a pair of forwardly extending arms on each side of said box pivotally secured in spaced relation to each other near the top of each of said upwardly extending arms,
  (f) a rake element pivotally secured to the forward ends of said arms, said forward ends of said arms being in spaced relation and each pair of arms on each side of said box being crossed at about the center thereof,
  (g) extensible members having one end pivotally secured to the top of said side walls and their other ends to said upwardly extending arms,
  (h) extensible members having one end secured to the outer side walls of said box and their other ends secured to one of said forwardly extending arms on each side of said box forwardly of the center thereof,
  (i) fluid means for movement of said first extensible members to move the upright arms forwardly and backwardly, and
  (j) fluid means for extending said second extensible means upwardly and downwardly for movement of the apron raking element in an upward and downward direction to move the dirt from said scraper means into said box.

5. The apparatus of claim 4 including means for unloading said dirt from said box.

6. Apparatus for handling dirt comprising:
  (a) a mobile frame,
  (b) a dirt collecting box having side walls and a fixed bottom between the side walls and extending forwardly from the back thereof a distance less than the length of the side walls forming a door opening forwardly of said bottom,
  (c) a forwardly extending scraper blade extending transversely of the dirt collecting box,
  (d) a door for closing the opening in the bottom of the box,
  (e) an endgate movably mounted in the rear of said box,
  (f) hydraulic means for moving said door to open and closed position,
  (g) hydraulic means for moving said endgate forwardly to push the dirt through the door opening,
  (h) upwardly extending arms secured to the top of each of said side walls near the rear thereof,
  (i) forwardly extending arms pivotally secured in spaced relation to each other near the top of each of said upwardly extending arms,
  (j) a rake element pivotally secured to the forward ends of said arms, said forward ends of said arms being in spaced relation and the arms on each side of said box being crossed at about the center thereof,
  (k) extensible members having one end secured to the top of said side walls and their other ends to said upwardly extending arms,
  (l) extensible members having one end secured to the outer side walls of said box and their other ends secured to one of said forwardly extending arms on each side of said box forwardly of the center thereof,
(m) fluid means for movement of said first extensible members to move the upright arms forwardly and backwardly, and
(n) fluid means for extending said second extensible means up in an upwardly and downwardly direction for movement of the raking element in a forward, downward and backward movement to move the dirt from said scraper blade into said box.

7. Apparatus for handling dirt comprising:
(a) a mobile frame,
(b) a dirt collecting box having side walls and a bottom extending forwardly from the back thereof a distance less than the length of the side walls forming a door opening forwardly of said bottom,
(c) a scraper blade extending transversely of the dirt collecting box,
(d) a frame pivotally mounted on the upper edges of the side walls near the rear end thereof, said frame having spaced upwardly extending arms including a pair of forwardly extending arms on each side of said frame having one of their ends pivotally secured in spaced relation to each other near the top of the rear portion of said frame, a rake element pivotally secured to the forward ends of said arms, said forward ends of said arms being in spaced relation and the arms being crossed at about the center thereof,
(e) extensible members having one end secured to the top of each of said side walls and their other ends to said upwardly extending arms,
(f) extensible members having one end secured to each of the outer side walls of said box and their other ends secured to one of said forwardly extending arms on each side of said box forwardly of the center thereof,
(g) fluid means for movement of said first extensible members to move the upwardly extending arms forwardly and backwardly, and
(h) fluid means for extending said second extensible members in an upwardly and downwardly direction both of said fluid means being adapted for movement of the raking element in an upward, forward, downward and backward movement to move the dirt from said scraper blade into said box.

8. In combination with an apparatus for handling dirt including a mobile frame having a dirt collecting box having side walls and a rear end and a bottom and side rails on the upper edge of said side walls and a scraper blade for loosening said dirt, a rake assembly comprising:
(a) a U-shaped bracket having upright arms pivotally attached to said side rails near the rear ends thereof,
(b) a rake member having side edges for movement inside said box,
(c) a pair of first forwardly extending arms having one end pivotally attached to said upright arms spaced from the upper ends of said upright arms, the other ends of said arms being pivotally attached to the upper side edges of said rake member,
(d) a pair of second forwardly extending arms having one end pivotally attached to said upright arms near the top thereof and the other ends of said second named arms being pivotally attached to the side edges of said rake member spaced downwardly from the first named arms,
(e) first extensible members having one end pivotally attached to said side rails spaced from the rear end thereof and their other ends attached to said upright arms of said U-shaped bracket,
(f) second extensible members each having one end secured to the outer side walls of said box and their other ends secured to said first named forwardly extending arms forwardly of the center thereof,
(g) fluid control means for movement of said first pair of extensible members to move the upright arms forwardly and backwardly,
(h) fluid control means for movement of said second pair of extensible means for movement of the raking member in an upwardly and downwardly and backward direction.

9. The combination of claim 8 wherein the apparatus includes means carried by said bottom to empty the dirt from said box.

10. An apparatus for handling dirt comprising:
(a) a mobile frame,
(b) a dirt collecting box having side walls and a fixed bottom between the side walls and extending forwardly from the back thereof a distance less than the length of the side walls forming a door opening forwardly of said bottom,
(c) a forwardly extending scraper blade extending transversely of the dirt collecting box,
(d) a door for closing the opening in the bottom of the box,
(e) an endgate movably mounted in the rear of said box,
(f) hydraulic means for moving said door to open and closed position,
(g) hydraulic means for moving said endgate forwardly to push the dirt through the door opening,
(h) means mounted on the dirt collecting box for movement of the dirt into said box as it is loosened by the scraper means, said means including a frame pivotally mounted on the rear portion of said box and having pairs of forwardly extending arms on each side of said box and having one of their ends pivotally attached to said frame in spaced relation, a raking element pivotally mounted on the forward ends of said pairs of arms, and extensible and retractable hydraulic means connected to said box, said second-named frame and said pairs of arms for movement of the raking element in an upwardly and downwardly direction and in a forwardly and rearwardly direction.

11. In a scraper,
(a) a carrier including spaced apart side walls and a blade and a bottom arranged to receive and support a load which is picked up by said blade,
(b) means for raising and lowering said carrier to selectively dispose the same in a loading or a carrying position,
(c) a rake blade disposed transversely of said carrier,
(d) means mounting said rake blade for bodily movement vertically and longitudinally of the direction of movement of the carrier for raking the load toward the rear end of said carrier,
  (1) said mounting means comprising pairs of first and second arms having one of their ends pivotally connected to the rake blade in vertically spaced relation, and extending rearwardly therefrom,
(e) third arms swingably mounted on the carrier rearwardly from said rake blade.
(f) means pivotally connecting the other ends of said first and second pair of arms to said third arm in spaced apart relation,
(g) means operably connected to said carrier and to the third arms for swinging same to move the rake blade longitudinally of the carrier,
(h) and means operably connected to said carrier and to one of the first and second pair of arms to move same up and down and thereby move the rake blade vertically relative to the carrier.

12. The apparatus of claim 11 and including at least one additional rake blade pivotally carried by one of each of said first and second pair of arms in spaced relation to the first rake blade, and link means pivotally connecting said second rake blade to the first rake blade.

(References on following page)

References Cited by the Examiner

UNITED STATES PATENTS

| | | |
|---|---|---|
| 1,157,291 | 10/1915 | Bradsher. |
| 1,427,188 | 8/1922 | Boldt _____ 198—10 |
| 2,198,087 | 4/1940 | Moore _____ 37—128 |
| 2,994,976 | 8/1961 | Hancock _____ 37—129 X |
| 3,063,173 | 11/1962 | Wardle. |
| 3,069,031 | 12/1962 | O'Leary _____ 37—129 X |

ABRAHAM G. STONE, *Primary Examiner.*

BENJAMIN HERSH, WILLIAM A. SMITH, III,
*Examiners.*